United States Patent
Iwao et al.

(10) Patent No.: US 8,173,043 B2
(45) Date of Patent: May 8, 2012

(54) PROCESS FOR PRODUCING FLUORESCENT SUBSTANCE COMPOSITE GLASS AND FLUORESCENT SUBSTANCE COMPOSITE GLASS GREEN SHEET

(75) Inventors: Masaru Iwao, Otsu (JP); Yoshio Umayahara, Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 13/064,904

(22) Filed: Apr. 25, 2011

(65) Prior Publication Data
US 2011/0198539 A1   Aug. 18, 2011

Related U.S. Application Data

(62) Division of application No. 11/919,209, filed as application No. PCT/JP2006/307623 on Apr. 11, 2006.

(30) Foreign Application Priority Data

May 11, 2005  (JP) ................................. 2005-138556
Dec. 5, 2005  (JP) ................................. 2005-350096

(51) Int. Cl.
*C03C 14/00*  (2006.01)
(52) U.S. Cl. ............... 252/301.4 R; 252/301.4 F; 501/32
(58) Field of Classification Search .................. 501/32; 252/301.4 R, 301.4 F
See application file for complete search history.

(56) References Cited

U.S. PATENT DOCUMENTS

| 3,077,456 | A | * | 2/1963 | Billian | .................. | 252/301.6 S |
| 3,816,328 | A | | 6/1974 | Levene | .................. | 252/301.6 S |
| 5,271,754 | A | * | 12/1993 | Bauerecker et al. | ............ | 65/17.3 |
| 2003/0025449 | A1 | | 2/2003 | Rossner | ........................ | 313/512 |
| 2004/0041309 | A1 | | 3/2004 | Katsumura et al. | ........... | 264/614 |

FOREIGN PATENT DOCUMENTS

| CN | 1463261 A | | 12/2003 |
| JP | 5-167253 A | | 7/1993 |
| JP | 11-180732 A | | 7/1999 |
| JP | 2002-290042 A | | 10/2002 |
| JP | 2003-258308 | * | 9/2003 |
| JP | 2003-258308 A | | 9/2003 |
| JP | 2005-11933 A | | 1/2005 |

OTHER PUBLICATIONS

Translation for JP 2003-258308.*
Chinese Office Action dated Jun. 15, 2011, issued in Chinese Patent Application No. 200680015995.2 (with English translation).
Chinese Office Action dated May 6, 2010, in CN Appln. No. 200680015995.2 and an English translation thereof.

* cited by examiner

*Primary Examiner* — Carol M Koslow
(74) *Attorney, Agent, or Firm* — Kubovcik & Kubovcik

(57) ABSTRACT

The present invention provides a fluorescent substance composite glass which is chemically stable, has a large size, is reduced in wall thickness, has a uniform thickness and therefore has a high energy conversion efficiency; a fluorescent substance composite glass green sheet and a process for producing the fluorescent substance composite glass. The fluorescent substance composite glass of the present invention is produced by baking a mixture containing a glass powder and an inorganic fluorescent substance powder, in which the energy conversion efficiency to a visible light wavelength region of 380 to 780 nm is 10% or more, when light having an emission peak in a wavelength range of 350 to 500 nm is applied.

4 Claims, 1 Drawing Sheet

[FIG. 1]
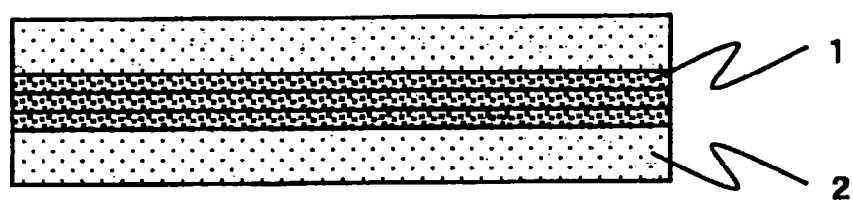
[FIG. 2]
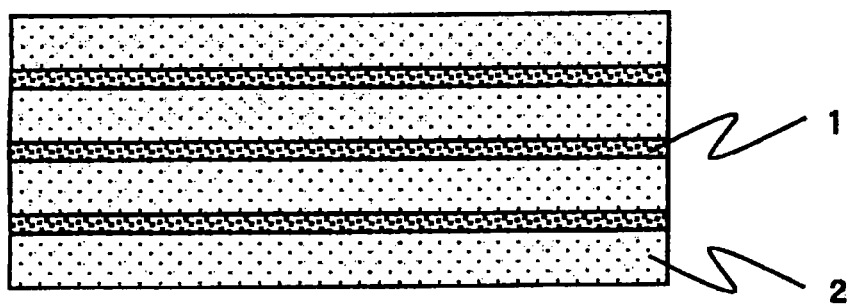

(1)

PROCESS FOR PRODUCING FLUORESCENT SUBSTANCE COMPOSITE GLASS AND FLUORESCENT SUBSTANCE COMPOSITE GLASS GREEN SHEET

This application is a division of application Ser. No. 11/919,209, filed Oct. 25, 2007, which is a 371 of international application PCT/JP2006/307623, filed Apr. 11, 2006, and which claims priority based on Japanese Patent Application Nos. 2005-138556 and 2005-350096, filed May 11, 2005, and Dec. 5, 2005, respectively, and which are incorporated herein by reference.

TECHNICAL FIELD

The present invention relates to a fluorescent substance composite glass, a fluorescent substance composite glass green sheet and a process for producing a fluorescent substance composite glass.

BACKGROUND ART

White LEDs are expected to be applied to illumination uses as light sources of the next generation which are to be used in place of incandescent lamps or fluorescent lamps.

In LED devices using a fluorescent substance to carry out conversion of wavelengths, a fluorescent substance powder is blended in, for example, a mold resin made of an organic type binder resin that seals a luminous plane of an LED chip to mold and a part or all of the emission from the LED chip is absorbed to carry out conversion into a desired wavelength.

However, there is a problem that the mold resin constituting the above LED device is deteriorated by high power short-wavelength light which is in the blue to ultraviolet region, causing discoloration.

In order to solve the above problem, Patent Reference 1 discloses a method for coating an LED chip by dispersing a fluorescent substance in a non-lead type low-melting point glass such as an $SnO_2$—$P_2O_5$ type glass or a TeO type glass.

Also, Patent Reference 2 discloses use of a fluorescent substance composite glass obtained by molding a glass powder and an inorganic fluorescent substance powder under pressure and baking the molded material to make glass, and dispersing a fluorescent substance powder in the glass.

Patent Reference 1: Publication of JP-A 2005-11933
Patent Reference 2: Publication of JP-A 2003-258308

DISCLOSURE OF THE INVENTION

However, the non-lead type low-melting point glass such as the $SnO_2$—$P_2O_5$ type glass or the TeO type glass disclosed in Patent Reference 1 has problems that it has low weatherability and reacts strongly with the fluorescent substance, resulting in deterioration of products.

Also, since the fluorescent substance composite glass described and disclosed in Patent Reference 2 is one obtained by molding a glass powder and an inorganic fluorescent substance powder under pressure and baking the molded material to make glass, no glass having a low wall thickness can be obtained, giving rise to a problem that no improvement in luminous efficacy can be expected. Also, the molding under pressure has a problem that a glass material having a large size and uniform thickness cannot be produced at low costs.

It is an object of the present invention to provide a fluorescent substance composite glass which is chemically stable, having a large size, a low wall thickness, and a uniform thickness and also high in energy conversion efficiency, a fluorescent substance composite glass green sheet and a process for producing a fluorescent substance composite glass.

The fluorescent substance composite glass according to the present invention is produced by baking a mixture containing a glass powder and an inorganic fluorescent substance powder, and is characterized in that the energy conversion efficiency to a visible light wavelength region of 380 to 780 nm is 10% or more, when light having an emission peak in a wavelength range of 350 to 500 nm is applied.

Also, the fluorescent substance composite glass green sheet according to the present invention is produced by kneading a mixture containing at least a glass powder, an inorganic fluorescent substance powder and an organic type solvent binder resin and molding the mixture into a sheet form.

Moreover, the process for producing a fluorescent substance composite glass according to the present invention includes laminating a restricting member, which does not react with the fluorescent substance composite glass green sheet at the baking temperature of the glass green sheet, on one or both surface(s) of the glass green sheet, then carrying out baking treatment and then removing the restricting member.

EFFECT OF THE INVENTION

The fluorescent substance composite glass green sheet of the present invention enables production of a fluorescent substance composite glass having a uniform thickness, a low wall thickness and a large size at low costs.

Also, according to the production process of the present invention, shrinkage and deformation in the direction of the plane can be reduced and therefore, a fluorescent substance composite glass having a low wall thickness and a large size can be obtained.

Further, the fluorescent substance composite glass of the present invention which may be produced in this manner is chemically stable, is reduced in wall thickness and has a uniform thickness and therefore has a high energy conversion efficiency.

BRIEF DESCRIPTION OF THE DRAWINGS

FIG. 1 is an explanatory view for illustrating a process for producing a fluorescent substance composite glass by laminating a restricting member on both surfaces of fluorescent substance composite glass green sheets laminated plurally.

FIG. 2 is an explanatory view for illustrating a process for producing a fluorescent substance composite glass by alternately laminating fluorescent substance composite glass green sheets and restricting members.

DESCRIPTION OF THE REFERENCE NUMERALS

1 Fluorescent substance composite glass green sheet
2 Restricting member

BEST MODE FOR CARRYING OUT THE INVENTION

The fluorescent substance composite glass of the present invention is constituted of a sintered body of a glass powder and an inorganic fluorescent substance powder and has a structure in which the inorganic fluorescent substance is dispersed in the glass. For this reason, this fluorescent substance composite glass is chemically stable and can be therefore limited in discoloration even if it is exposed to high power light for a long time. Also, a fluorescent substance composite glass can be obtained which has a low wall thickness, is uniform and has a high energy conversion efficiency.

When the energy conversion efficiency is less than 10%, this is undesirable because power consumption is increased. The energy conversion efficiency is preferably 11% or more and more preferably 12% or more. The energy conversion efficiency in the present invention is a value given by the equation: $c/(a-b) \times 100(\%)$ when the energy of the light source is a (W: watt), the energy of light having the same wavelength as that of the light source transmitting the fluorescent substance composite glass is b (W) and the energy of light converted by the wavelength of the light source in the fluorescent substance composite glass is c (W).

Also, in order to obtain a fluorescent substance composite glass having a higher energy conversion efficiency, it is only required to decrease the porosity of the fluorescent substance composite glass to 10% or less. When the porosity is larger than 10%, light scattering is so intensified that the amount of light to be transmitted is reduced, leading to easy reduction in energy conversion efficiency. Also, the mechanical strength of the fluorescent substance composite glass tends to be significantly reduced. The porosity is more preferably in a range from 8% or less. The porosity means a value found by the equation: $(1-\text{actual density/theoretical density}) \times 100(\%)$ based on an actual density and a theoretical density measured by the Archimedes' method.

Also, in order to obtain a fluorescent substance composite glass having a low wall thickness, a uniform thickness and a large size, it is only required to use a green sheet produced by kneading a glass powder, an inorganic fluorescent powder and an organic type solvent binder resin and molding the mixture into a sheet form.

However, in the above fluorescent substance composite glass green sheet, the proportion of the glass powder is large. Therefore, if it is baked as it is, the glass is fluidized and easily shrunk in a plane direction by the surface tension of the glass. It is therefore difficult to obtain a fluorescent substance composite glass having a low wall thickness, a uniform thickness and a large size. There is such an idea that the proportion of the inorganic fluorescent substance powder is increased to limit shrinkage in a plane direction. However, if the proportion of the inorganic fluorescent powder is increased, excited light is scattered on the fluorescent substance, bringing about a reduction in emission strength, and an increase in baking time to densify, causing a foaming phenomenon resulting from a reaction between the inorganic fluorescent substance and the glass, resulting in a remarkable reduction in emission strength.

In light of this, the present invention makes it possible to obtain a fluorescent substance composite glass having a low wall thickness, a uniform thickness and a large size by laminating a restricting member, which does not react with a fluorescent substance composite glass green sheet at the baking temperature of the glass green sheet, on one or both surface(s) of the glass green sheet, then carrying out baking treatment and then removing the restricting member. As the restricting member, a green sheet containing an inorganic composition or a porous ceramic substrate may be used.

As the inorganic fluorescent substance powder to be used in the present invention, any inorganic fluorescent substance powder usually available on the market may be used. Examples of the inorganic fluorescent substance include those containing YAG type fluorescent substances, oxides, nitrides, oxide-nitrides, sulfides, rare earth metal acid sulfides, halides, aluminic acid chlorides or halophosphoric acid chlorides. The YAG type fluorescent substances and the oxide fluorescent substances are stable even if they are mixed with the glass and heated to high temperatures. Fluorescent substances such as nitrides, oxide-nitrides, sulfides, rare earth metal acid sulfides, halides, aluminic acid chlorides or halophosphoric acid chlorides are easily reacted with the glass by heating in the sintering process to easily cause abnormal reactions including foaming and discoloring. The degree of these abnormal reactions is significantly increased as the sintering temperature becomes higher. However, in the case of using these inorganic fluorescent substances, these substances may be used by optimizing the baking temperature and the composition of the glass.

The glass powder to be used in the present invention has a function as a medium keeping the inorganic fluorescent substance stably. Also, because the tones of the sintered body are different and there is a difference in reactivity with the inorganic fluorescent substance depending on the composition type of the glass to be used, it is necessary to select the composition of the glass to be used in consideration of various conditions. Moreover, it is important to determine the amount of the inorganic fluorescent substance and thickness of the member suitable to the composition of the glass. Any material may be used as the glass powder without any particular limitation insofar as it is resistant to a reaction with the inorganic fluorescent substance. As the glass powder, an $SiO_2$—$B_2O_3$—RO (RO represents MgO, CaO, SrO or BaO) type glass, an $SiO_2$—$B_2O_3$ type glass, $SiO_2$—$B_2O_3$—$R_2O$ ($R_2O$ represents $Li_2O$, $Na_2O$ or $K_2O$) type glass, an $SiO_2$—$B_2O_3$—$Al_2O_3$ type glass, an $SiO_2$—$B_2O_3$—ZnO type glass or a ZnO—$B_2O_3$ type glass may be used. Among these, the $SiO_2$—$B_2O_3$—RO type glass or the ZnO—$B_2O_3$ type glass which is resistant to a reaction with the inorganic fluorescent substance in baking is preferably used.

The preferable range (mass percentage) of each component in the $SiO_2$—$B_2O_3$—RO type glass is as follows: 30 to 70% of $SiO_2$, 1 to 15% of $B_2O_3$, 0 to 10% of MgO, 0 to 25% of CaO, 0 to 10% of SrO, 8 to 40% of BaO, 10 to 45% of RO, 0 to 20% of $Al_2O_3$ and 0 to 10% of ZnO. The reason why the above ranges are defined is as follows.

$SiO_2$ is a component that forms a network of glass. If the content of $SiO_2$ is less than 30% by mass, chemical durability tends to be impaired. If the content of $SiO_2$ exceeds 70% by mass, sintering temperature is made high, so that the fluorescent substance is easily deteriorated. $SiO_2$ is more preferably in a range from 40 to 60%.

$B_2O_3$ is a component that drops the melting temperature of the glass to significantly improve the melting ability of the glass. If the content of $B_2O_3$ is less than 1% by mass, its effect is scarcely obtained. If the content of $B_2O_3$ exceeds 15% by mass, chemical durability of the glass tends to be deteriorated. $B_2O_3$ is more preferably in a range from 2 to 10%.

MgO is a component that drops the melting temperature of the glass to significantly improve the melting ability of the glass. If the content of MgO exceeds 10% by mass, chemical durability of the glass tends to be deteriorated. MgO is more preferably in a range from 0 to 5%.

CaO is a component that drops the melting temperature of the glass to significantly improve the melting ability of the glass. If the content of CaO exceeds 25% by mass, chemical durability of the glass tends to be deteriorated. CaO is more preferably in a range from 3 to 20%.

SrO is a component that drops the melting temperature of the glass to significantly improve the melting ability of the glass. If the content of SrO exceeds 10% by mass, chemical durability of the glass tends to be deteriorated. SrO is more preferably in a range from 0 to 5%.

BaO is a component that drops the melting temperature of the glass to improve the melting ability of the glass and to suppress the reaction with the fluorescent material. If the content of BaO is less than 8% by mass, its effect on limitation of a reaction with the fluorescent substance tends to be reduced. On the other hand, if the content of BaO exceeds 40% by mass, chemical durability of the glass tends to be deteriorated. BaO is more preferably in a range from 10 to 35%.

In order to improve the melting ability of the glass without deteriorating chemical durability, the amount of RO which is the sum of the amounts of MgO, CaO, SrO and BaO, is preferably 10 to 45%. If the content of RO is less than 10% by mass, the effect of improving the melting ability is scarcely obtained. On the other hand, if the content of RO exceeds 45% by mass, chemical durability is easily deteriorated. RO is more preferably in a range from 11 to 40%.

$Al_2O_3$ is a component that improves chemical durability. If the content of $Al_2O_3$ exceeds 20% by mass, the melting ability of the glass tends to be impaired. $Al_2O_3$ is more preferably in a range from 2 to 15%.

ZnO is a component that drops the melting temperature of the glass to thereby improve the melting ability of the glass. If the content of ZnO exceeds 10% by mass, chemical durability of the glass tends to be impaired. ZnO is more preferably in a range from 1 to 7%.

Besides the above components, various components may be added to the extent that the purpose of the invention is not damaged. For example, alkali metal oxides, $P_2O_5$, $La_2O_3$ or the like may be added.

Preferable range (mass percentage) of each component in the Zn—$B_2O_3$ type glass is as follows: 5 to 60% of ZnO, 5 to 50% of $B_2O_3$ and 0 to 30% of $SiO_2$. The reason why the above ranges are defined is as follows.

ZnO is a component that forms a network of glass. If the content of ZnO is less than 5% by mass, the sintering temperature becomes higher and therefore, the fluorescent substance is easily deteriorated. On the other hand, if the content of ZnO exceeds 60% by mass, chemical durability tends to be deteriorated. ZnO is more preferably in a range from 20 to 50%.

$B_2O_3$ is a component that forms a network of glass. If the content of $B_2O_3$ is less than 5% by mass, the sintering temperature becomes high and the fluorescent substance is therefore easily deteriorated. If the content of $B_2O_3$ exceeds 50% by mass, on the other hand, chemical durability tends to be impaired. $B_2O_3$ is more preferably in a range from 10 to 50%.

$SiO_2$ is a component that improves the durability of the glass. If the content of $SiO_2$ exceeds 30% by mass, the sintering temperature becomes so high that the fluorescent substance is easily deteriorated. $SiO_2$ is more preferably in a range from 0.1 to 25%.

Besides the above components, various components may be added to the extent that the purpose of the invention is not damaged. For example, alkali metal oxides, alkali earth metal oxides, $Al_2O_3$ or the like may be added.

The energy conversion efficiency of the fluorescent substance composite glass is changed according to the type and content of the fluorescent substance particles dispersed in the glass and the wall thickness of the fluorescent substance composite glass. It is only necessary for the content of the fluorescent substance and the wall thickness of the fluorescent substance composite glass to be adjusted so that the energy conversion efficiency is optimum. However, if the fluorescent substance is excessive, it is difficult to sinter and the porosity is increased, giving rise to the problem that excited light is hardly efficiently applied to the fluorescent substance and the mechanical strength of the fluorescent substance composite glass is easily reduced. On the other hand, if the content of the fluorescent substance is too low, it is difficult to make the fluorescent substance emit light sufficiently. Therefore, the proportion of the contents of the glass and the fluorescent substance by mass is preferably adjusted to a range from 99.99:0.01 to 70:30, more preferably a range from 99.95:0.05 to 80:20 and particularly preferably 99.92:0.08 to 85:15.

Next, the fluorescent substance composite glass green sheet of the present invention will be explained.

In the case of using the fluorescent substance composite glass in the form of a green sheet, a binder, a plasticizer, a solvent and the like are used together with the glass powder and the inorganic fluorescent substance powder.

As the glass powder, the $SiO_2$—$B_2O_3$—RO (RO represents MgO, CaO, SrO or BaO) type glass, the $SiO_2$—$B_2O_3$ type glass, the $SiO_2$—$B_2O_3$—$R_2O$ ($R_2O$ represents $Li_2O$, $Na_2O$ or $K_2O$) type glass, the $SiO_2$—$B_2O_3$—$Al_2O_3$ type glass, the $SiO_2$—$B_2O_3$—ZnO type glass or the ZnO—$B_2O_3$ type glass may be used as mentioned above. Among these, the $SiO_2$—$B_2O_3$—RO type glass or the ZnO—$B_2O_3$ type glass, which is resistant to a reaction with the inorganic fluorescent substance in baking, is preferably used.

When the $SiO_2$—$B_2O_3$—RO type glass is used, it is preferable to use a glass powder containing the following components: 30 to 70% of $SiO_2$, 1 to 15% of $B_2O_3$, 0 to 10% of MgO, 0 to 25% of CaO, 0 to 10% of SrO, 8 to 40% of BaO, 10 to 45% of RO, 0 to 20% of $Al_2O_3$ and 0 to 10% of ZnO (mass percentage).

Also, when the ZnO—$B_2O_3$ type glass is used, it is preferable to use a glass powder containing the following components: 5 to 60% of ZnO, 5 to 50% of $B_2O_3$ and 0 to 30% of $SiO_2$ (mass percentage).

As the inorganic fluorescent substance powder, YAG type fluorescent substances, oxides, nitrides, oxide-nitrides, sulfides, rare earth metal acid sulfides, halides, aluminic acid chlorides or halophosphoric acid chlorides as described above are preferably used.

The proportion of the contents of the glass and the fluorescent substance is preferably adjusted to a range from 99.99: 0.01 to 70:30 by mass at any rate, though it may be properly adjusted according to the type and content of the fluorescent substance powder and the wall thickness of the fluorescent substance composite glass.

The proportion of the glass powder and the inorganic fluorescent substance powder in the green sheet is usually about 50 to 80% by mass.

The binder is a component that strengthens the dried film and imparts flexibility to the film. The content of the binder is usually about 0.1 to 30% by mass. As the binder, for example, a polyvinylbutyral resin, a methacrylic resin or the like may be used. These resins may be used either singly or by mixing them.

The plasticizer is a component that controls the drying speed and imparts flexibility to the dried film. The content of the plasticizer is usually about 0 to 10% by mass. As the plasticizer, for example, dibutyl phthalate, butylbenzyl phthalate and the like may be used. These materials may be used either singly or by mixing them.

The solvent is a material that makes a slurry of the materials. The content of the solvent is usually about 1 to 30% by mass. As the solvent, for example, toluene, methyl ethyl ketone and the like may be used either singly or by mixing them.

As the process for manufacturing the fluorescent substance composite glass green sheet, there is a method in which the above glass powder and the inorganic fluorescent substance powder are mixed and the binder, the plasticizer, the solvent and the like are added in fixed amounts to the obtained mixture to make a slurry. Next, the slurry is molded into a sheet form on a film such as polyethylene terephthalate (PET) by a doctor blade method. In succession, the molded sheet is dried to remove the organic type solvent binder, thereby making a fluorescent substance composite glass green sheet.

Next, a process which is preferably used to produce the fluorescent substance composite glass of the present invention will be explained.

First, the fluorescent substance composite glass green sheet produced by the above method and a restricting member which does not react with the fluorescent substance composite glass green sheet at the baking temperature of the fluorescent substance composite glass green sheet are prepared and cut into desired sizes. Next, the restricting member is laminated on one or both surface(s) of the fluorescent substance composite glass green sheet and the both are integrated with each other by thermocompression bonding to form a laminate, which is then baked to obtain a sintered body. In succession, the restricting member is removed to obtain a fluorescent substance composite glass.

In this manner, a fluorescent substance composite glass can be manufactured, which is chemically stable, has a large size, reduced in wall thickness, has a uniform thickness and gives a high energy conversion efficiency.

As the restricting member, a green sheet containing an inorganic composition or a porous ceramic substrate may be used.

When a green sheet containing an inorganic composition is used as the restricting member, any material may be used as the inorganic composition without any particular limitation insofar as it is not sintered at the baking temperature of the fluorescent substance composite glass green sheet. For example, $Al_2O_3$, MgO, $ZrO_2$, $TiO_2$, BeO and BN may be used either singly or as a mixture. Also, the green sheet containing an inorganic composition may be obtained by using the same mixing ratio and production method as the above fluorescent substance composite glass green sheet.

Also, when a porous ceramic substrate is used as the restricting member, any porous ceramic may be used without any particular limitation insofar as it is resistant to adhesion to the fluorescent substance composite glass. For example, $SiAl_2O_5$, $Al_2O_3$, MgO and $ZrO_2$ may be used as the restricting member.

The fluorescent substance complex green sheet and the restricting member may be cut after the laminate is formed. This makes it possible to obtain a fluorescent substance composite glass reduced in a variation of dimensions before and after the composite glass is baked.

Also, if it is intended to obtain a large amount of the fluorescent substance composite glass by one baking treatment, plural fluorescent substance complex green sheets and restricting members may be alternately laminated, thermocompression bonded and baked to obtain a large amount of the fluorescent substance composite glass. Also, if it is intended to obtain a thicker fluorescent substance composite glass, a method may be adopted in which plural fluorescent substance complex green sheets are laminated and a restricting member is laminated on one or both surface(s) of the laminated fluorescent substance composite glass green sheet, followed by thermocompression bonding and baking treatment to thereby obtain the intended composite glass.

Also, with regard to the temperature at which the laminate is baked, the laminate is preferably baked at 750 to 1000° C. The reason is that a dense sintered body is scarcely obtained at a temperature lower than 750° C. On the other hand, the inorganic fluorescent substance is deteriorated and the glass is easily reacted with the inorganic fluorescent substance at a temperature higher than 1000° C.

Moreover, when a green sheet containing an inorganic composition is used as the restricting member, an unsintered inorganic composition is left unremoved on the surface of the fluorescent substance composite glass after the baking treatment. However, the inorganic composition left unremoved can be removed by carrying out ultrasonic cleaning.

Example 1

The present invention will be explained in detail by way of Examples.

First, a fluorescent substance composite glass green sheet was manufactured in the following manner.

Glass raw materials made of various oxides were compounded in such a manner as to obtain a composition containing 50% of $SiO_2$, 5% of $B_2O_3$, 10% of CaO, 25% of BaO, 5% of $Al_2O_3$ and 5% of ZnO based on mass percentage. After these components were uniformly mixed, the mixture was put in a platinum crucible and melted at 1400° C. for 2 hours to obtain uniform glass. This glass was crushed using alumina balls and classified to obtain a glass powder having an average particle diameter of 2.5 μm. Next, an inorganic fluorescent substance powder (YAG fluorescent substance powder, manufactured by KASEI OPTONIX, LTD., average particle diameter: 8 μm) was added to the produced glass powder in a mass ratio of 95:5 and these components were mixed to produce a mixture powder. Then, 30% by mass of a methacrylic acid resin as a binder, 3% by mass of dibutyl phthalate as a plasticizer and 20% by mass of toluene as a solvent were added to 100 of the produced mixture powder and these components were mixed to make a slurry. In succession, the above slurry was molded into a sheet on a PET film by a doctor blade method and dried to obtain a fluorescent substance composite glass green sheet 50 μm in thickness.

Next, a green sheet made of an inorganic composition was produced as a restricting member.

As the inorganic composition, an alumina powder (ALM-21, manufactured by Sumitomo Aluminum Co., average particle diameter: 2 μm) was used to obtain an alumina green sheet 200 μm in thickness in the same mixing ratio and method as in the method of producing the fluorescent substance composite glass green sheet as described above.

In succession, each green sheet was cut into a size of 100×100 mm and three fluorescent substance composite glass green sheets were laminated on the above alumina green sheet as shown in FIG. 1. Moreover, the alumina green sheet was laminated on the above glass green sheets and these sheets were integrated by thermocompression bonding to produce a laminate, which was then baked at 900° C. Thereafter, the baked laminate was subjected to ultrasonic cleaning to remove an unsintered alumina layer left unremoved on the obtained sintered body to thereby manufacture a fluorescent substance composite glass having a size of 100×100 mm and a wall thickness of 120 μm.

The fluorescent substance composite glass obtained in this manner was irradiated with blue light from behind the fluorescent substance glass, to obtain white transmitted light. Also, the fluorescent substance composite glass was subjected to tests to measure energy conversion efficiency and porosity, to find that the energy conversion efficiency was 16% and the porosity was 2%.

Example 2

First, the fluorescent substance complete glass green sheet produced in Example 1 and a mullite substrate which was a porous ceramic as the restricting member were prepared.

Next, the mullite substrate and the fluorescent substance composite glass green sheet were cut into a size of 100×100 mm. Then, as shown in FIG. 2, four mullite substrates and three fluorescent substance glass green sheets were alternately laminated, integrated by thermocompression bonding to produce a laminate and baked at 900° C. After that, the mullite substrates were removed to produce three fluorescent substance composite glasses each having a size of 100×100 mm and a wall thickness of 40 μm.

The fluorescent substance composite glass obtained in this manner was irradiated with blue light from behind the fluorescent substance glass, to obtain white transmitted light. Also, the fluorescent substance composite glass was subjected to tests to measure energy conversion efficiency and porosity, to find that the energy conversion efficiency was 13% and the porosity was 2%.

Example 3

Glass raw materials made of various oxides were compounded in such a manner as to obtain a composition containing 35% of ZnO, 40% of $B_2O_3$, 10% of $SiO_2$, 10% of $Na_2O$ and 5% of $Al_2O_3$ based on mass percentage. After these components were uniformly mixed, the mixture was put in a platinum crucible and melted at 1100° C. for 2 hours to obtain uniform glass. This glass was crushed using alumina balls and classified to obtain a glass powder having an average particle diameter of 2.5 μm. Next, an inorganic fluorescent substance powder (YAG fluorescent substance powder, manufactured by KASEI OPTONIX, LTD., average particle diameter: 8 μm) was added to the produced glass powder in a mass ratio of 95:5 and these components were mixed to produce a mixture powder. Then, 30% by mass of a methacrylic acid resin as a binder, 3% by mass of dibutyl phthalate as a plasticizer and 20% by mass of toluene as a solvent were added to 100 of the produced mixture powder and these components were mixed to make a slurry. In succession, the above slurry was molded into a sheet on a PET film by a doctor blade method and dried to obtain a fluorescent substance composite glass green sheet 50 μm in thickness.

Next, the manufactured fluorescent substance composite glass green sheet was used to manufacture a fluorescent substance composite glass having a size of 100×100 mm and a wall thickness of 40 μm, in the same manner as in Example 1. As to the baking temperature, the baking was carried out at 600° C. The fluorescent substance composite glass obtained was irradiated with blue light from behind the fluorescent substance glass, to obtain white transmitted light. Also, the fluorescent substance composite glass was subjected to tests to measure energy conversion efficiency and porosity, to find that the energy conversion efficiency was 17% and the porosity was 1%.

The energy conversion efficiency was found by using a spectrophotometer to measure the energy (a) of a light source, the energy (b) of light having the same wavelength as the light source transmitted through the fluorescent substance composite glass and the energy (c) of light converted by the wavelength of the light source in the fluorescent substance composite glass and by calculating from the equation: $c/(a-b)\times100(\%)$.

Also, the porosity was found by using the Archimedes' method to measure an actual density and a theoretical density and by calculating from the equation: (1−actual density/theoretical density)×100(%).

The invention claimed is:

1. A fluorescent substance composite glass green sheet produced by kneading a mixture containing at least a glass powder, an inorganic fluorescent substance powder and an organic type solvent binder resin, and molding the mixture into a sheet form, wherein the glass powder is a glass containing the following components: 30 to 70% of $SiO_2$, 1 to 15% of $B_2O_3$, 0 to 10% of MgO, 0 to 25% of CaO, 0 to 10% of SrO, 8 to 40% of BaO, the total amount of MgO, CaO SrO and BaO being 10 to 45%, 0 to 20% of $Al_2O_3$ and 0 to 10% of ZnO based on mass percentage.

2. A fluorescent substance composite glass green sheet produced by kneading mixture containing at least a glass powder, an inorganic fluorescent substance powder and an organic type solvent binder resin, and molding the mixture into a sheet form, wherein the glass powder is a glass containing the following components: 5 to 60% of ZnO, 5 to 50% of $B_2O_3$ and 0 to 30% of $SiO_2$ based on mass percentage.

3. The fluorescent substance composite glass green sheet according to claim 1, wherein the mixing ratio by mass of the glass powder to the inorganic fluorescent substance powder is in a range of from 99.99:0.01 to 70:30.

4. The fluorescent substance composite glass green sheet according to claim 2, wherein the mixing ratio by mass of the glass powder to the inorganic fluorescent substance powder is in a range of from 99.99:0.01 to 70:30.

* * * * *